UNITED STATES PATENT OFFICE.

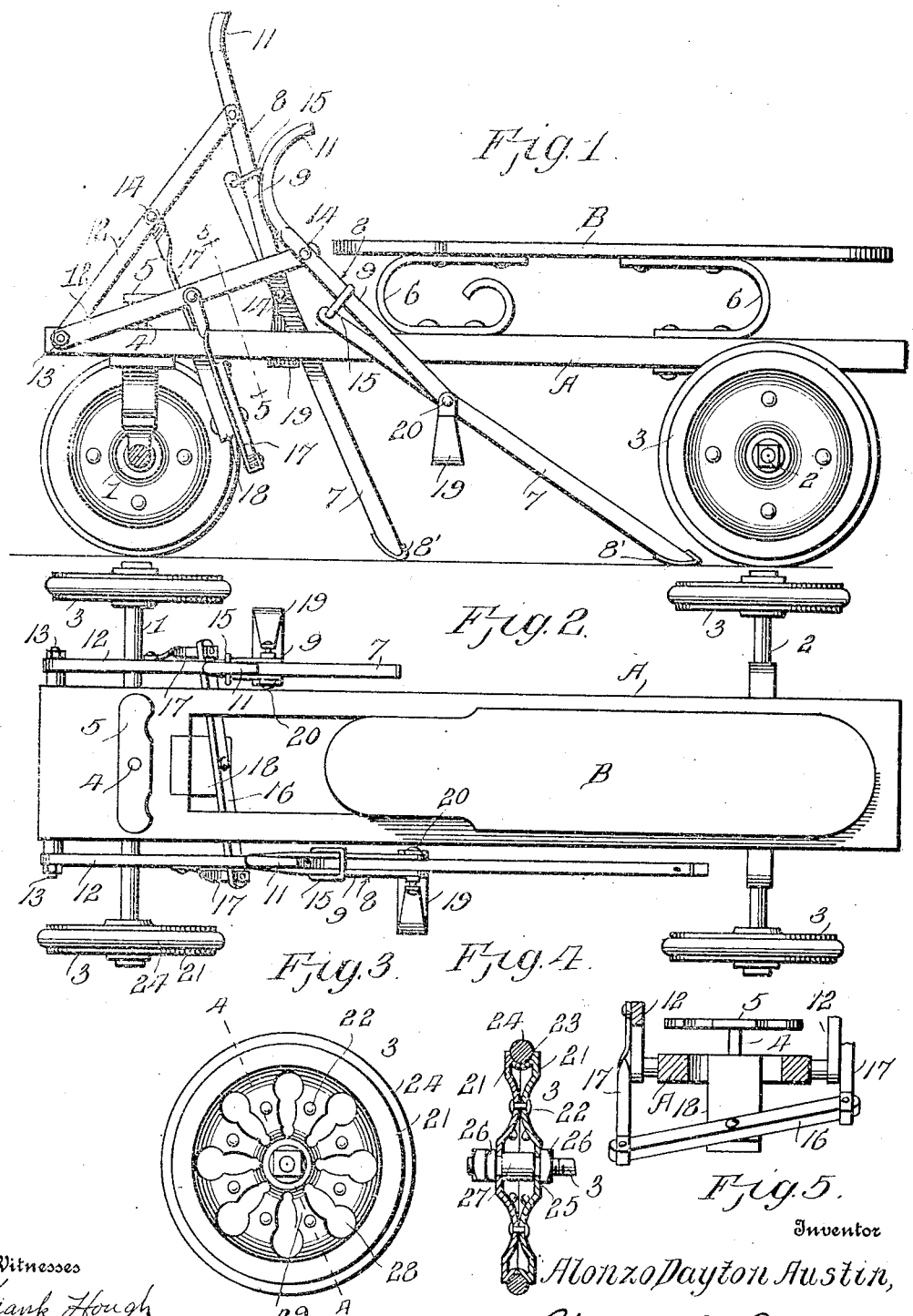

ALONZO DAYTON AUSTIN, OF JACKSON, MICHIGAN.

WAGON-PROPELLER.

No. 892,495.  Specification of Letters Patent.  Patented July 7, 1908.

Application filed July 26, 1907. Serial No. 385,731.

*To all whom it may concern:*

Be it known that I, ALONZO DAYTON AUSTIN, a citizen of the United States, residing at Jackson, in the county of Jackson and State of Michigan, have invented new and useful Improvements in Wagon-Propellers, of which the following is a specification.

This invention relates to a wagon for children, and relates more particularly to a propelling mechanism of that type in which push pedals are employed that are adapted to engage the surface of the ground to enable the occupant of the wagon to propel the same forwardly by imparting a thrust to the pedals.

The invention has for one of its objects to improve and simplify the construction and operation of mechanisms of this character so as to be comparatively easy and inexpensive to manufacture, readily operated, and capable of propelling the wagon with considerable power.

A further object of the invention is the provision of push pedals that are adapted to be brought into engagement with the ground and a thrust imparted thereto either by hand or foot, or both, for propelling the wagon, the pedals being moved forwardly after each thrust to enable them to be brought into engagement with the ground again to thus propel the wagon by a succession of such movements.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a side elevation of the wagon. Fig. 2 is a plan view thereof. Fig. 3 is a side elevation of one of the wheels. Fig. 4 is a section on line 4—4, Fig. 3. Fig. 5 is a sectional view on line 5—5, Fig. 1.

Similar reference characters are employed to designate corresponding parts throughout the several views.

Referring to the drawing, A designates the body of the wagon that is suitably supported on front and rear axles 1 and 2 on which are rubber tired wheels 3, the front axle being connected with a vertical pivot 4 on which is a steering bar 5 whereby the occupant can steer the movement of the vehicle by the feet. On the body A is a seat B that is supported on springs 6 so as to prevent the transmission of shocks from the wheels to the seat.

The propelling mechanism comprises a pair of push rods or pedals 7 disposed at opposite sides of the vehicle body and which have their lower ends shod with rubber or other suitable material, as at 8'. Hingedly connected with each pedal 7 at a point adjacent its middle is a handle member 8 composed of iron bars 9 arranged on opposite sides of the pedal and connected by a bolt or pivot 20 with the latter, and on the upper ends of the rods 9 is a grip or handle 11. The handle members 8 are each connected with a link 12 fulcrumed on the ends of a rod 13 on the front of the vehicle body and having its opposite end pivotally connected at 14 with the handle member. The upper ends of the pedals are loosely connected with their corresponding handle members by rings 15.

In order to operate the pedals alternately and to bring one handle forwardly while the other is pulled backwardly, an oscillating bar or walking beam 16 is arranged under the vehicle body at a point behind the front axle and the ends of the beam are connected by rods 17 with the members 12. The body A carries a depending bracket piece 18 on which the beam 16 is pivoted. It is to be noted that the handles are so arranged that a powerful thrust can be imparted by means of the pedals by pulling the handles backwardly and downwardly. Each link 12 and connected handle member 8 with its pedal 7, constitute a toggle mechanism so that a propelling effect can be produced.

To adapt the device for operation by the feet, as well as the hands, a stirrup 19 is mounted at the pivotal connection 20 between the handle members 8 and pedals 7 so as to be within convenient reach of the child while seated on the board B. By this means, the wagon can be propelled by the hands or feet or both.

The wheels 3 are preferably made of pressed sheet metal and in halves 21 that are secured together by rivets 22. The wheel is provided with a circumferential groove 23 for the reception of a rubber tire 24. The pieces 21 are provided with central openings 25 for the reception of the axle 3, as shown in Fig. 4, which axle may be a piece of gas pipe threaded to receive the nuts 26, there being a spacing sleeve 27 on the axle between the two halves of the wheel to strengthen the structure. By constructing a wheel in this manner, great rigidity is obtained so that it will be capable of standing rough usage, and furthermore, the construction is inexpensive. By cutting away the metal as at 28, Fig. 3, spokes 29 are provided, thereby giving more or less resiliency to the wheel.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. The combination of a wagon with a propelling mechanism therefor, said mechanism comprising a plurality of ground-engaging push pedals, handles connected with the pedals, and stirrups attached to the pedals at points intermediate the ends thereof.

2. The combination of a wagon comprising a wheel-supported body, and a spring-supported seat thereon, with a propelling mechanism comprising a pair of pedals adapted to be brought into engagement with the ground, handle members connected at their lower ends with the pedals at intermediate points for actuating the latter, devices connecting the upper ends of the pedals with the members, and links connected with the body to move in a vertical plane and attached to the handle members at points intermediate their ends.

3. The combination of a wagon, with a propelling mechanism therefor, said mechanism comprising a pair of pedals extending downwardly and rearwardly at the sides of the body of the wagon and adapted to engage the ground, handle members suitably connected with the pedals, links pivoted at the front of the wagon and hingedly connected with the handle members, and foot-receiving devices at the points of connection between the members and pedals for propelling by foot.

4. The combination of a wagon, with a propelling mechanism, said mechanism comprising a pair of pedals arranged at the side of the wagon and adapted to engage the ground, handles hingedly connected with the pedals, links connected with the wagon and pedals, means connected with the links for causing the pedals to operate simultaneously in opposite directions and foot receiving devices attached to the pedals.

5. The combination of a wagon with a propelling mechanism, said mechanism comprising a pair of pedals adapted to engage the surface over which the wagon travels for propelling the latter, links connected with the wagon and pedals, a walking beam mounted on the wagon, connecting members between the ends of the walking beam and means for producing alternate movement of the pedals, foot operating means for operating the pedals and hand operating means for operating the pedals.

6. The combination of a wagon, with a propelling mechanism, said mechanism comprising a pair of pedals adapted to engage the surface over which the wagon travels for propelling the latter, links connected with the wagon and pedals, a walking beam mounted on the wagon, connecting members between the ends of the walking beam and links for producing alternate movement of the pedals, handles for operating the pedals, and stirrups mounted on the pedals.

In testimony whereof, I affix my signature in presence of two witnesses.

ALONZO DAYTON AUSTIN.

Witnesses:
PAUL W. HAEFNER,
WARREN A. JIRON.